(12) United States Patent  (10) Patent No.: US 12,536,793 B2
Wirén et al.  (45) Date of Patent: Jan. 27, 2026

(54) ENABLING IDENTIFICATION OF OBJECTS

(71) Applicant: Telefonaktiebolaget LM Ericsson (publ), Stockholm (SE)

(72) Inventors: Richard Wirén, Vantaa (FI); Volodya Grancharov, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 584 days.

(21) Appl. No.: 17/787,383

(22) PCT Filed: Dec. 20, 2019

(86) PCT No.: PCT/EP2019/086879
§ 371 (c)(1),
(2) Date: Jun. 20, 2022

(87) PCT Pub. No.: WO2021/121644
PCT Pub. Date: Jun. 24, 2021

(65) Prior Publication Data
US 2022/0375217 A1 Nov. 24, 2022

(51) Int. Cl.
*H04W 24/00* (2009.01)
*B64U 101/30* (2023.01)
*G06V 20/17* (2022.01)

(52) U.S. Cl.
CPC .......... *G06V 20/17* (2022.01); *B64U 2101/30* (2023.01)

(58) Field of Classification Search
CPC .... H04W 24/00; G06V 20/17; B64U 2101/30
See application file for complete search history.

(56) References Cited

U.S. PATENT DOCUMENTS

| | | | |
|---|---|---|---|
| 6,266,514 B1 * | 7/2001 | O'Donnell | H04W 24/02 455/67.7 |
| 9,049,627 B2 * | 6/2015 | Teyeb | H04W 36/00835 |
| 9,439,092 B1 | 9/2016 | Chukka et al. | |
| 10,117,216 B1 * | 10/2018 | Dixon | H04W 64/00 |
| 10,475,239 B1 * | 11/2019 | Priest | G03B 15/006 |
| 11,469,974 B1 * | 10/2022 | Cruise | G06F 11/3006 |

(Continued)

*Primary Examiner* — Dominic E Rego
(74) *Attorney, Agent, or Firm* — Murphy, Bilak & Homiller, PLLC

(57) ABSTRACT

The present disclosure relates to a method performed by a device (10) of enabling identification of a telecommunication equipment (30, 51, 52, 53, 54), and a device (10) performing the method. The present disclosure further relates to a method performed by a device (40) of performing identification of a telecommunication equipment (30, 51, 52, 53, 54), and a device (40) performing the method. In an aspect, a method performed by a device (10) of enabling identification of a telecommunication equipment (30, 51, 52, 53, 54) is provided. The method comprises acquiring (S101) at least one visual representation of the telecommunication equipment (30, 51, 52, 53, 54), acquiring (S102), by performing a radio frequency scan of the telecommunication equipment (30, 51, 52, 53, 54) for each acquired visual representation, a cell identifier for the telecommunication equipment (30, 51, 52, 53, 54) and associating (S103) the acquired cell identifier for the telecommunication equipment (30, 51, 52, 53, 54) with the acquired visual representation of the telecommunication equipment (30, 51, 52, 53, 54).

25 Claims, 8 Drawing Sheets

(56) References Cited

U.S. PATENT DOCUMENTS

| | | | |
|---|---|---|---|
| 2011/0149728 A1* | 6/2011 | Lee | H04W 8/26 |
| | | | 370/230 |
| 2012/0309394 A1* | 12/2012 | Radulescu | H04W 28/18 |
| | | | 455/436 |
| 2017/0046873 A1* | 2/2017 | Terry | H04N 13/275 |
| 2017/0064587 A1* | 3/2017 | Xu | H04W 36/0094 |
| 2017/0237484 A1 | 8/2017 | Heath et al. | |
| 2018/0075649 A1* | 3/2018 | Godwin | B64U 20/80 |
| 2018/0211441 A1* | 7/2018 | Priest | B64U 10/14 |
| 2018/0232871 A1* | 8/2018 | Terry | H04W 24/10 |
| 2018/0255465 A1* | 9/2018 | Priest | G06V 20/17 |
| 2019/0130075 A1* | 5/2019 | Henein | G06F 21/577 |
| 2019/0132787 A1* | 5/2019 | Ryan | H04W 12/12 |
| 2020/0371251 A1* | 11/2020 | Hou | H04W 4/029 |
| 2021/0136631 A1* | 5/2021 | Lee | H04W 36/0007 |
| 2021/0325859 A1* | 10/2021 | Yan | G05B 19/41865 |
| 2021/0326759 A1* | 10/2021 | Ardel | G05B 23/0254 |
| 2023/0194651 A1* | 6/2023 | Anchala | H04B 17/391 |
| | | | 455/456.1 |
| 2023/0396977 A1* | 12/2023 | Akdim | H04W 64/00 |

* cited by examiner

ENABLING IDENTIFICATION OF OBJECTS

TECHNICAL FIELD

The present disclosure relates to a method performed by a device of enabling identification of a telecommunication equipment, and a device performing the method. The present disclosure further relates to a method performed by a device of performing identification of a telecommunication equipment, and a device performing the method.

BACKGROUND

Today, visual object detection of telecommunication equipment is commonly employed.

For instance, in the case of telecommunication equipment, a site such as a cell tower comprising antennae and electronic communications equipment being mounted on a radio tower is typically remotely located and further difficult to access for an operator or maintenance personnel.

Thus, it is highly useful for purposes such as e.g. monitoring, maintenance and planning if visual object detection of the cell tower can be performed, and even of individual components of the tower.

This may be attained by having for instance an unmanned aerial vehicle (UAV), commonly referred to as a drone, circle the tower and capture images from which the different components can be identified and thus detected.

However, while it typically is rather straightforward to discriminate between different type of equipment, such as for instance antennae on the one hand and remote radio units (RRUs) on the other, it is oftentimes difficult to discriminate between equipment within the same group of components, such as for example antennae of different models and/or vendors.

SUMMARY

An objective is to solve, or at least mitigate, this problem in the art and thus to provide an improved method of enabling identification of an object.

This objective is attained in a first aspect by a method performed by a device of enabling identification of a telecommunication equipment. The method comprises acquiring at least one visual representation of the telecommunication equipment, acquiring, by performing a radio frequency scan of the telecommunication equipment for each acquired visual representation, a cell identifier for the telecommunication equipment and associating the acquired cell identifier for the telecommunication equipment with the acquired visual representation of the telecommunication equipment.

This objective is attained in a second aspect by a device configured to enable identification of a telecommunication equipment. The device comprises a camera, a radio frequency transceiver, a processing unit and a memory, said memory containing instructions executable by said processing unit, whereby the device is operative to acquire, with the camera, at least one visual representation of the telecommunication equipment, acquire, by using the transceiver to perform a radio frequency scan of the telecommunication equipment for each acquired visual representation, a cell identifier for the telecommunication equipment and to associate the acquired cell identifier for the telecommunication equipment with the acquired visual representation of the telecommunication equipment.

This objective is attained in a third aspect by a method performed by a device of performing identification of telecommunication equipment. The method comprises acquiring at least one visual representation of the telecommunication equipment and a cell identifier having been acquired by performing a radio frequency scan of the telecommunication equipment for the acquired at least one visual representation and mapping the acquired cell identifier to pre-stored information identifying the telecommunication equipment.

This objective is attained in a fourth aspect by a device configured to perform identification of telecommunication equipment. The device comprises a processing unit and a memory, said memory containing instructions executable by said processing unit, whereby the device is operative to acquire at least one visual representation of the telecommunication equipment and a cell identifier having been acquired by performing a radio frequency scan of the telecommunication equipment for the acquired at least one visual representation and mapping the acquired cell identifier to pre-stored information identifying the telecommunication equipment.

A device such as for instance a UAV may be used e.g. circle around a cell tower being equipped with a group of antennae. As the UAV circles around the cell tower, it captures images of the antennae using a camera.

In addition to capturing images (or video), the UAV acquires cell identifiers for to the respective antenna using radio frequency scanning and associates the cell identifier with the corresponding captured image.

This is advantageous, since for every captured image, the UAV will in addition to the image data also have cell identifiers for each antenna.

Subsequently, the acquired cell identifier is mapped to pre-stored data associated with the particular cell identifier comprising details for identifying the antenna in the captured image associated with the particular cell identifier, such as a for instance vendor and model. The pre-stored data may for instance be located in a network Operating Support System (OSS), but alternatively the UAV or any other appropriate device may hold a look-up table enabling the mapping.

In an embodiment, a category to which the telecommunication equipment belongs is detected from the captured image. Hence, In the case of the telecommunication equipment being an antenna, the UAV may indeed detect that the equipment is an antenna, even though model and vendor cannot be determined from the captured image.

In an embodiment, keypoints are extracted from the detected telecommunication equipment and depth information is attained of the acquired visual representation (being e.g. a captured image) by matching the extracted keypoints to a 3D representation of the telecommunication equipment and positioning the device in relation to the telecommunication equipment as determined by the attained depth information. For instance, the device being e.g. a UAV may be positioned in front of the telecommunication equipment.

In an embodiment, the cell identifier is comprised in an acquired System Information Block type 1 (SIB1) message.

In an embodiment, the radio frequency scan comprising a passive scan.

In an embodiment, the device of the second aspect is configured to, in case a number of visual representations (e.g. captured images) are acquired and a plurality of cell identifiers are acquired for each captured image, create a signal set comprising a strongest signal carrying the cell identifier for each visual representation, select, from the created set, a signal differing the most in strength with respect to a second strongest signal; wherein the step of associating the acquired cell identifier for the telecommunication equipment with the acquired visual representation of the telecommunication equipment comprises, associating the cell identifier carried by the signal differing most in strength with respect to the second strongest signal with the visual representation for which the selection is made, and removing the associated cell identifier from the signal set, wherein the selecting, from the created set, of the signal differing the most in strength with respect to the second strongest signal and the associating of the cell identifier carried by said signal being repeated until all acquired visual representation have been associated with a cell identifier, or if there are no signals remaining in the set, associating the remaining cell identifier with a corresponding remaining visual representation.

Further embodiments will be described in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
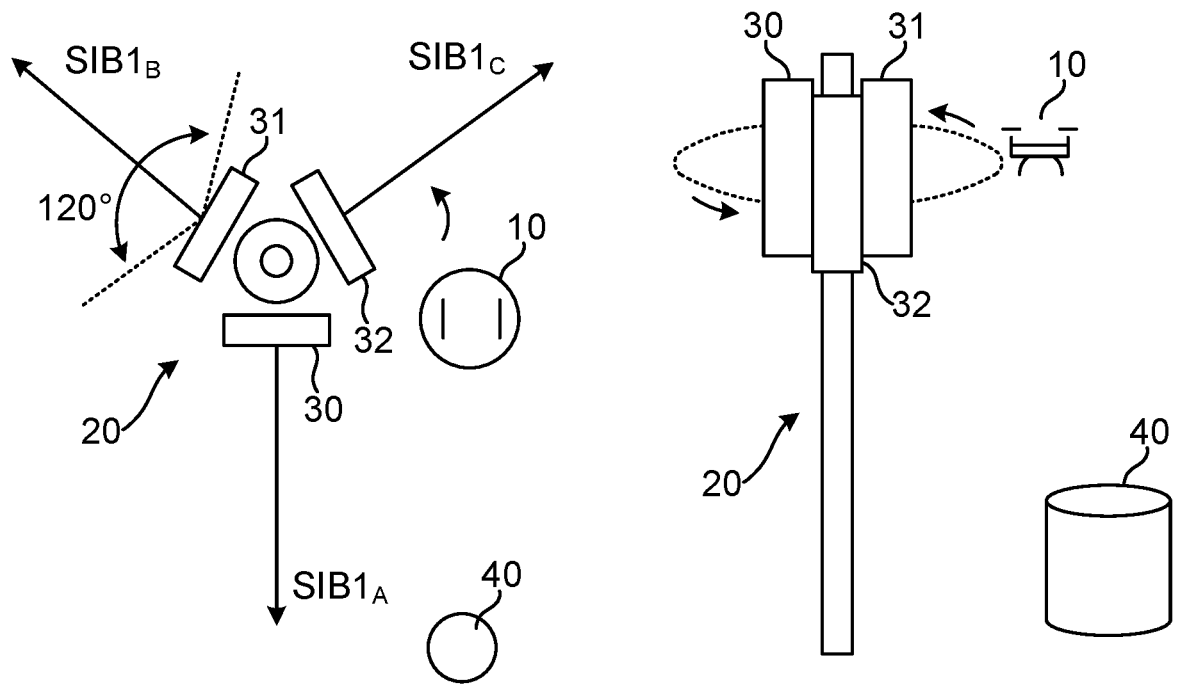
FIG. 1 illustrates an embodiment of a method of a device configured to enable identification of an object.

FIG. 1 illustrates an embodiment of a method of a device configured to enable identification of an object. In this exemplifying embodiment, the device is embodied in the form of a UAV and the telecom equipment is embodied in the form of antennae.

Figure 2:
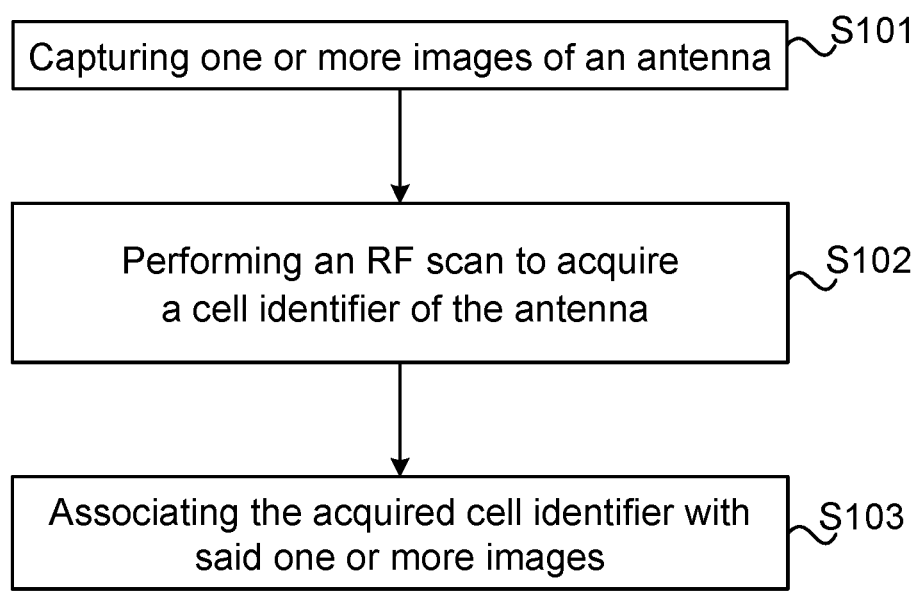
FIG. 2 shows a flowchart of a method of a device configured to enable identification of an object according to an embodiment.

Reference will further be made to FIG. 2 illustrating a flowchart of a method of a device configured to enable identification of an object in the form of a telecommunication equipment according to an embodiment.

On a right-hand side of FIG. 1, it is shown in a side view that an UAV 10 circles around a cell tower 20 being equipped with three antennae 30, 31, 32. As the UAV 10 circles around the cell tower 20, it captures images of the antennae in step S101. This is a common approach for gathering information of telecom equipment mounted for instance to a cell tower.

However, in this embodiment, as illustrated on a left-hand side of FIG. 1 showing a top view of the cell tower 20 and the three antennae 30, 31, 32, where the UAV 10 circles the cell tower 20 in a counter-clockwise direction, the UAV 10 will in addition to step S101 of acquiring visual representations of the antennas 30, 31, 32 by capturing images further in step S102 acquire information indicating an identifier of the respective antenna 30, 31, 32 using radio frequency (RF) scanning.

For instance, the information identifying the antennae may be embodied in the form om a so-called System Information Block type 1 (SIB1) message sent by each antenna 30, 31, 32 to the UAV 10 as the UAV 10 circles around the antennae capturing images. The UAV 10 will thus associate the acquired SIB1 message with the corresponding captured image in step S103. Further, a look-up table may subsequently have to be used where details (type of equipment, model, vendor, etc.) of each antenna are mapped to specific information of the acquired SIB1 message. Alternatively, a network Operating Support System (OSS) is utilized by the UAV 10 (or any other appropriate device) to obtain the antenna details using information contained in the SIB1 message.

In a further advantageous embodiment, passive RF scan is utilized by the UAV 10 to acquire the SIB1 message. Hence, in contrast to an active RF scan, the UAV 10 will not transmit a probe request to the antennae 30, 31, 32 and await a probe response, but will simply wait for the respective antenna to send the information. Advantageously, with the passive scan, the UAV is not required to transmit the probe request to the respective antenna, but will receive the information once the respective antenna transmits the information. This will consume less energy at the UAV as compared to if an active scan would be performed.

As an example, the UAV 10 or subsequently server 40 with which the UAV 10 may communicate may extract from the acquired SIB1 message the so called Cell Global Identity (CGI) which in its turn comprises a Mobile Country Code (MCC), a Mobile Network Country Code (MNC), a Location Area Code (LAC) and a Cell Identifier (CI). The CI or CGI are subsequently used to obtain the antenna details.

In this exemplifying embodiment first antenna 30 is identified by $SIB1_A$, second antenna 31 is identified by $SIB1_B$ and third antenna 32 is identified by $SIB1_C$, i.e. by the CGI or CI included in the respective SIB1 message.

Now, the UAV 10, the server 40 or any other appropriate device to which the information acquired by the UAV 10 is sent may hold the following look-up table (only a small part of the look-up table is shown):

TABLE 1

| SIB message | Equipment |
|---|---|
| $SIB_{1_A}$ | Antenna, CommScope, SBNHH-1D65A |
| $SIB_{1_B}$ | Antenna, CommScope, TBXLHB-6565A-VTM |
| $SIB_{1_C}$ | Antenna, Kathrein, 742-264-V02 |

Figure 3A:
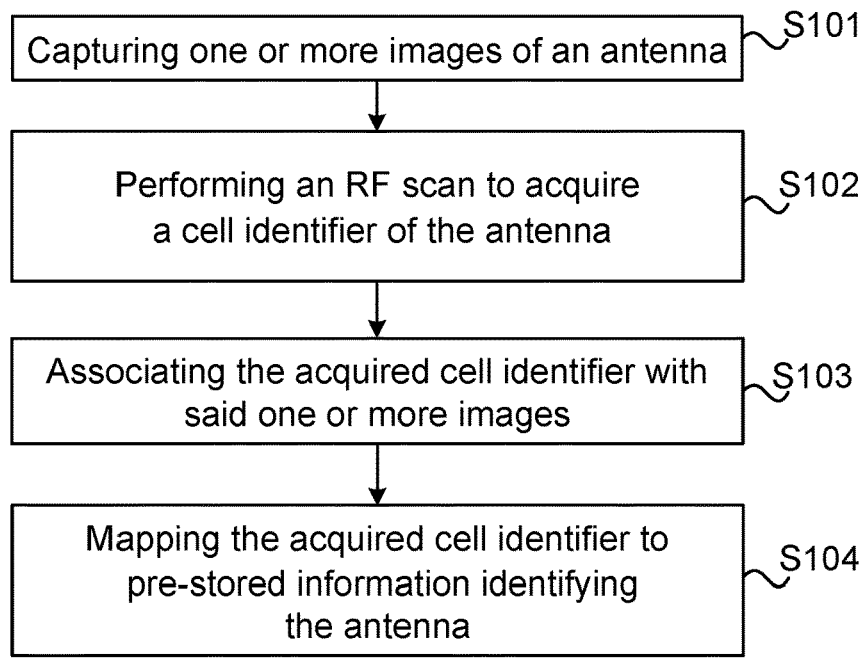
FIG. 3a shows a flowchart of a method of a device configured to enable identification of an object according to another embodiment.

Hence, with reference to the flowchart of FIG. 3a illustrating an embodiment, by capturing an image of the antenna 30 in step S101, acquiring the SIB1 (which contains a cell identifier) transmitted by the antenna 30 in step S102 and by associating the acquired cell identifier (received with SIB1) with the captured image in step S103, the antenna can subsequently by identified.

Thus, for an image captured of an object transmitting message $SIB1_A$ (i.e. the first antenna 30), it can be concluded from the CGI or the CI of the SIB1 message and the look-up table of Table 1 hereinabove by performing mapping in step S104 that the object indeed is an antenna, that the vendor is CommScope and that the model is SBNHH-1D65A.

Alternatively, a more straightforward approach is for the UAV 10 to turn to a network Operating Support System (OSS), where the CGI or the CI of the SIB1 message can be used extract the information given hereinabove in Table 1, since the unique CGI for each antenna is included in the OSS along with detailed antenna information. However, it should be noted that the look-up table of Table 1 can be used if for some reason the OSS is not available.

Figure 3B:
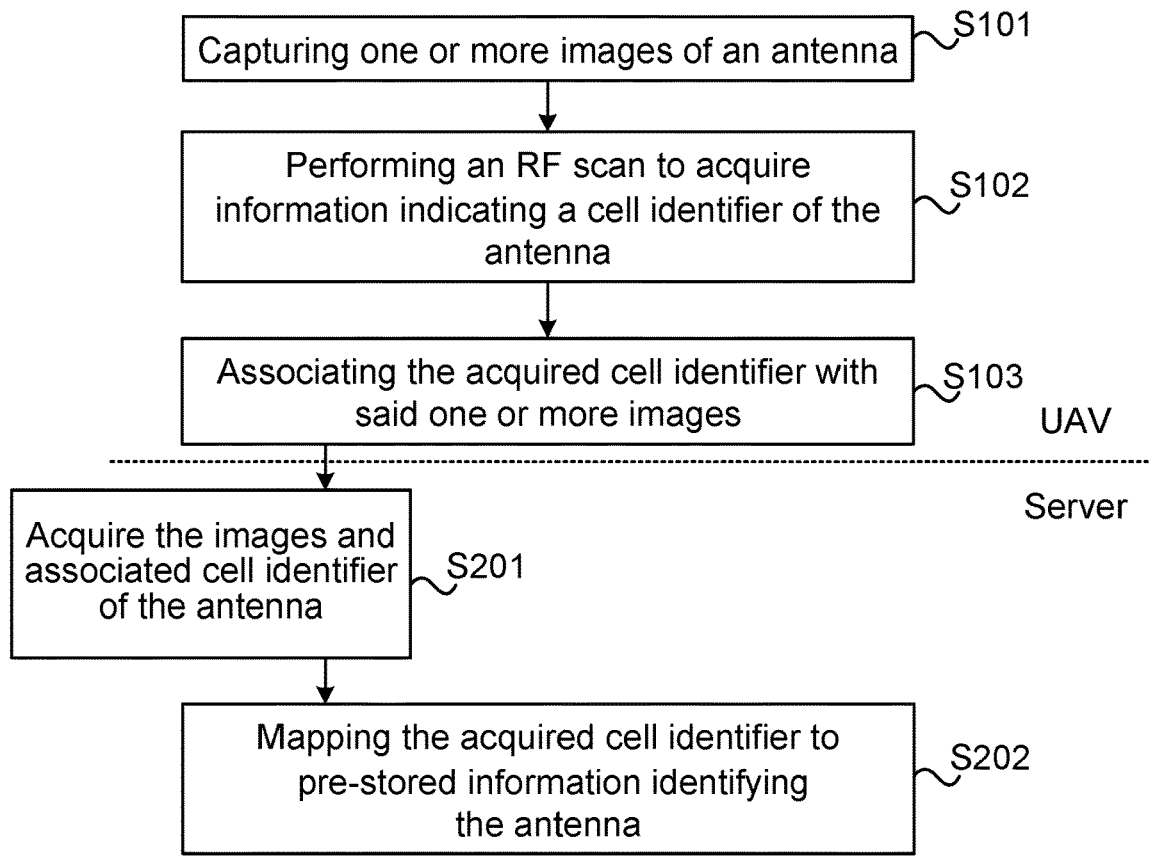
FIG. 3b shows a flowchart of a method of a device configured to enable identification of an object according to an alternative embodiment.

FIG. 3b shows an alternative embodiment where the first three steps of capturing images (step S101), performing the RF scan to obtain a cell identifier such as the CGI or the CI (step S102) and associating the CI/CGI to the images (step S103) are performed by the UAV 10.

Thereafter, in step S201, the UAV 10 transmits the images and the associated CI/CGI to the server 40 using any appropriate means of communication such as wireless transmission, or by having the server 40 read a storage medium of the UAV 10 where all the captured images are stored along with the associated CI/CGI. Finally, the CI/CGI is mapped in step S202 to pre-stored data associated with the particular CI/CGI comprising details for identifying the first antenna 30 detected in the captured images as described hereinabove with reference to Table 1, such as a for instance vendor and model (or turns to the OSS for the mapping of the CI/CGI to the pre-stored information identifying the first antenna 30).

In an embodiment, the CGI or CI identifying the antennae in the look-up table or by the OSS enable identification of for instance model and vendor of an object, but not the actual type of equipment.

Figure 4:
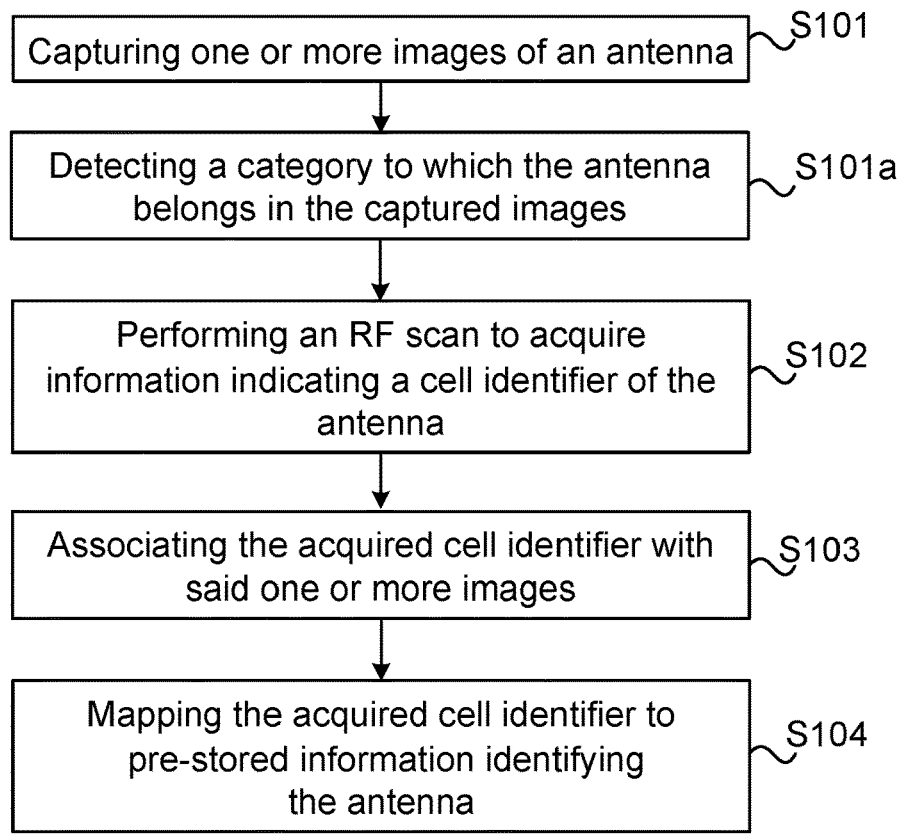
FIG. 4 shows a flowchart of a method of a device configured to enable identification of an object according to a further embodiment.

Therefore, with reference to a flowchart of FIG. 4, based on one or more images of an object captured in step S101, the telecommunication equipment is visually identified—not necessarily by the UAV 10 but by the server 40 or some other appropriate device and not necessarily at the moment of capturing the images but later—as belonging to an "antenna" group or category. Hence, it is visually detected from the one or more captured images in step S101a that an object, for instance first antenna 30, indeed is an antenna, using for instance convolutional neural network (CNN) based detectors.

Thereafter (or even before detecting a particular object in an image), as described hereinabove, the UAV 10 acquires the SIB1 message of the first antenna using RF scanning and associates the SIB1 message (or appropriate parts of it, such as the CGI), with the one or more images, possibly with the antenna 30 highlighted in the images or at least associating an indicator with the images that the object in the image belongs to the "antenna" category.

Finally, the SIB1/CGI is mapped in step S104 to pre-stored data associated with the particular SIB1/CGI comprising details for identifying the first antenna 30 detected in the captured images as described hereinabove with reference to Table 1, such as a for instance vendor and model.

As is understood, in practice this process is undertaken for all three antennae 30, 31, 32 mounted to the cell tower 20 in FIG. 3, advantageously having the effect that all three antennae 30, 31, 32 subsequently are identified from the look-up table using the captured images and the associated SIB1 messages $SIB1_A$, $SIB1_B$ and $SIB1_C$.

Figure 5:
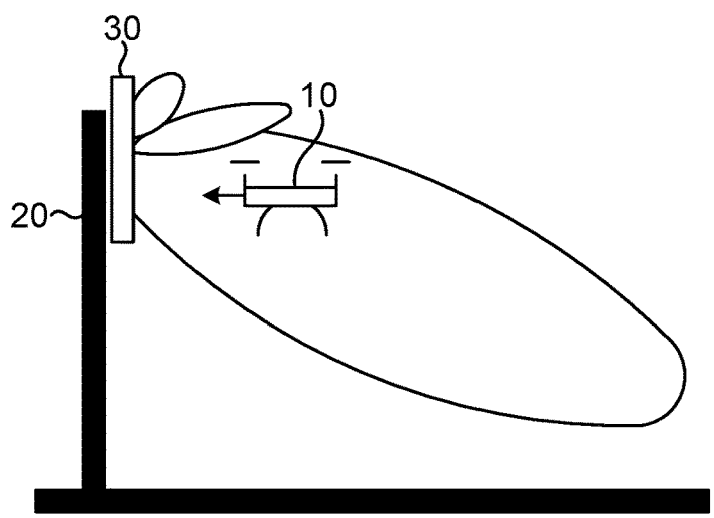
FIG. 5 illustrates a preferred position of a UAV in front of an antenna.

FIG. 5 illustrates the UAV 10 hovering in front of the first antenna 30 of the cell tower 20.

In order to associate a correct SIB1 message with an antenna in a captured image, the UAV 10 should preferably be positioned in front of the antenna to read the correct SIB1 message. That is, the closer the UAV 10 is positioned to an antenna the more likely it is that the UAV 10 will read the SIB1 message of that particular antenna. To avoid having the UAV 10 associate an acquired SIB1 message with the wrong antenna, the movement of the UAV 10 is in an embodiment controlled such that the UAV 10 is positioned in front of the object which it aims to identify.

As shown in FIG. 5, the UAV 10 should preferably be positioned within a main lobe in front of the antenna 30 mounted to the cell tower 20 rather than in any one of the smaller side lobes in order to acquire an SIB1 message having a greatest possible strength.

Figure 6:
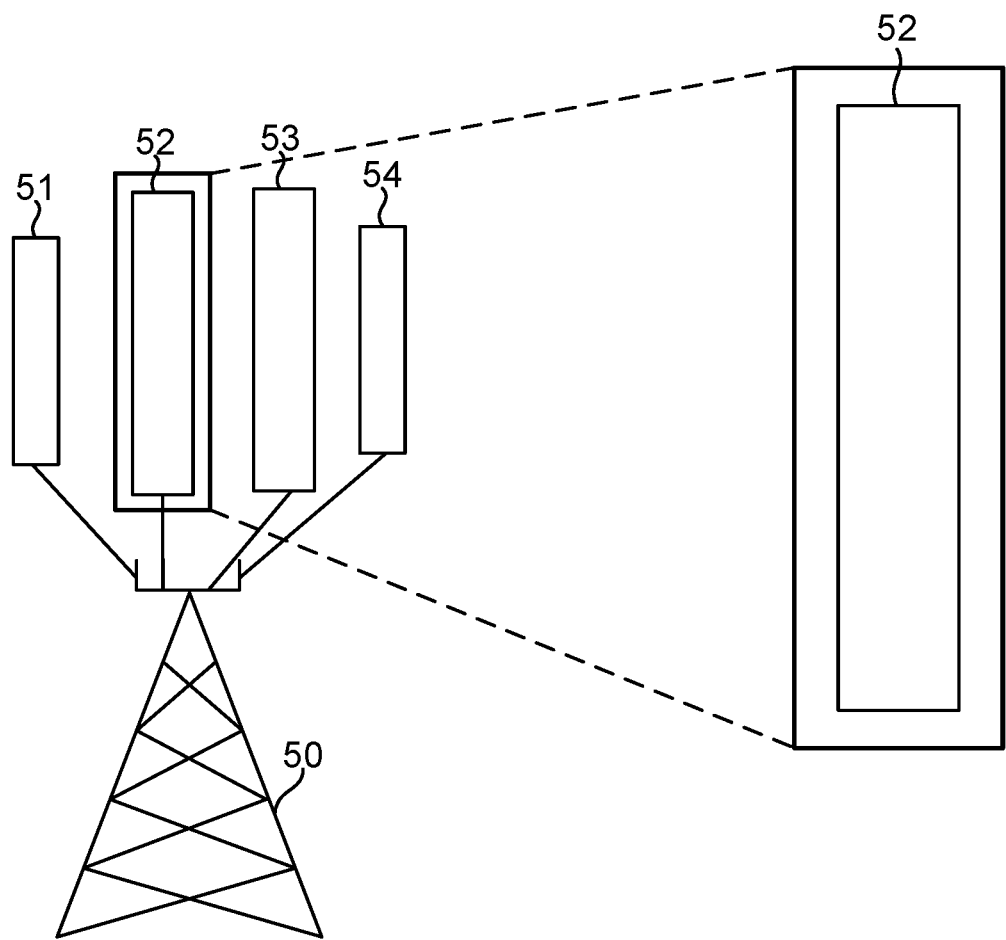
FIG. 6 illustrates identification of an antenna from a captured image according to an embodiment.

FIG. 6 illustrates a cell tower 50 where antennae are located relatively close to each other. As seen from a camera view of the UAV 10, four antennae 51, 52, 53, 54 are mounted adjacent to each other at the cell tower 50. This is a challenging scenario if only 2D visual information (i.e. information acquired by the camera of the UAV) is relied on.

Figure 7:
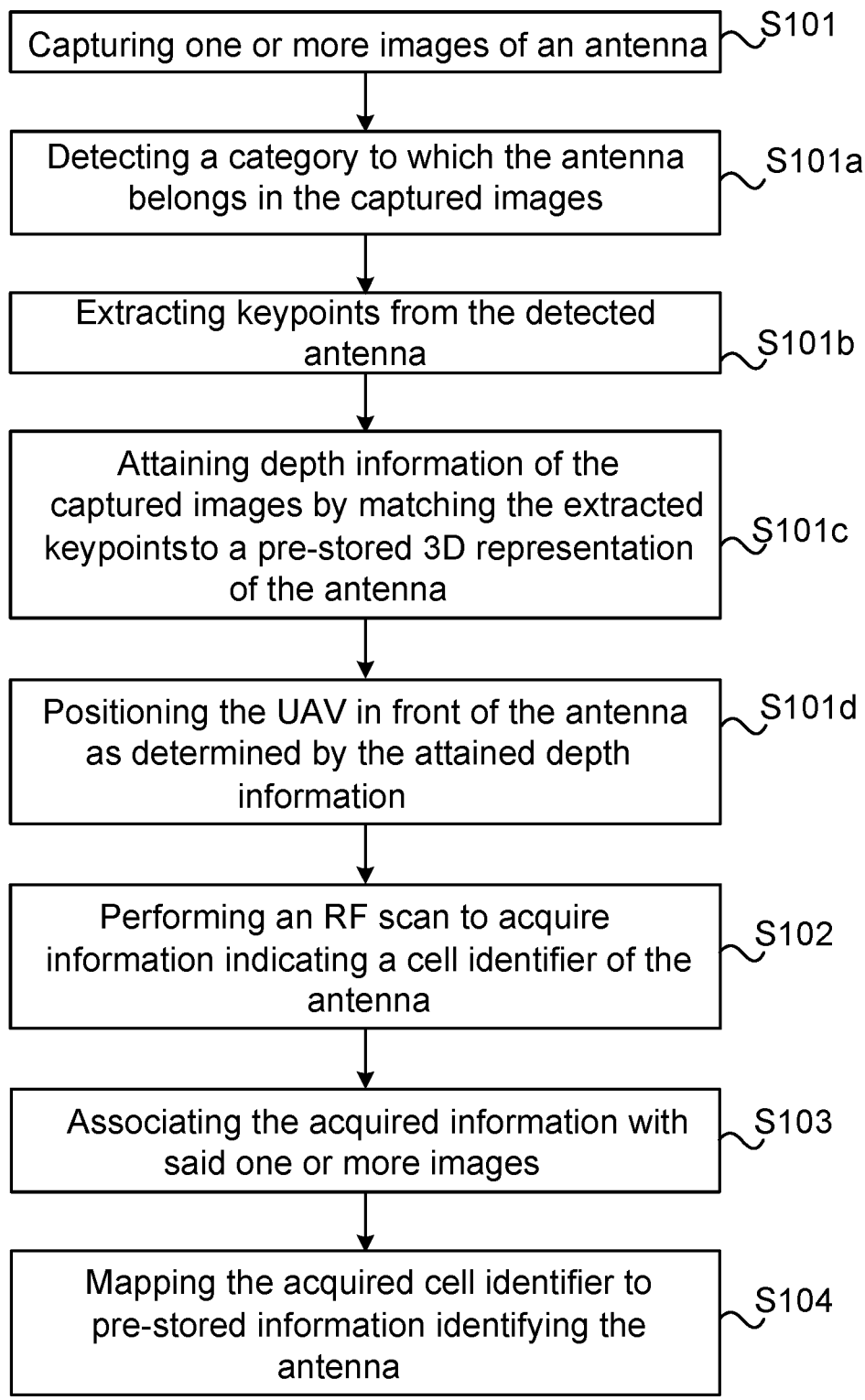
FIG. 7 shows a flowchart of a method of a device configured to enable identification of an object according to an embodiment.

FIG. 7 shows a flowchart of a method of a device configured to enable identification of an object according to a further embodiment. Based on the one or more images of an object captured in step S101 and the visual object detection of step S101a to categorize the objects in the images as antennae as previously described, the UAV will after having detected the antenna 52 (as illustrated by means of the box surrounding the antenna 52 in FIG. 6) in step S101b extract distinct features from the visually detected antenna 52. These distinct features are commonly referred to as keypoints or interest points, which are visually detected from for instance corners, logotypes, lines, etc. of an object.

From an already available 3D representation of an antenna to which the extracted keypoints are matched, estimated depth information of the keypoints is attained in step Stoic. This 3D representation may previously have been created from captured images of the antenna using for instance algorithms including maximally stable extremal regions (MSER), speeded up robust feature (SURF) and scale-invariant feature transform (SIFT). Thus the extracted keypoints are matched to selected keypoints of the available and pre-stored 3D representation (commonly known as point clouds). Correspondence between the extracted keypoints and the selected keypoints of the 3D representation is established across the images which allows for estimation of depth of a scene based on triangulation.

Figure 8:
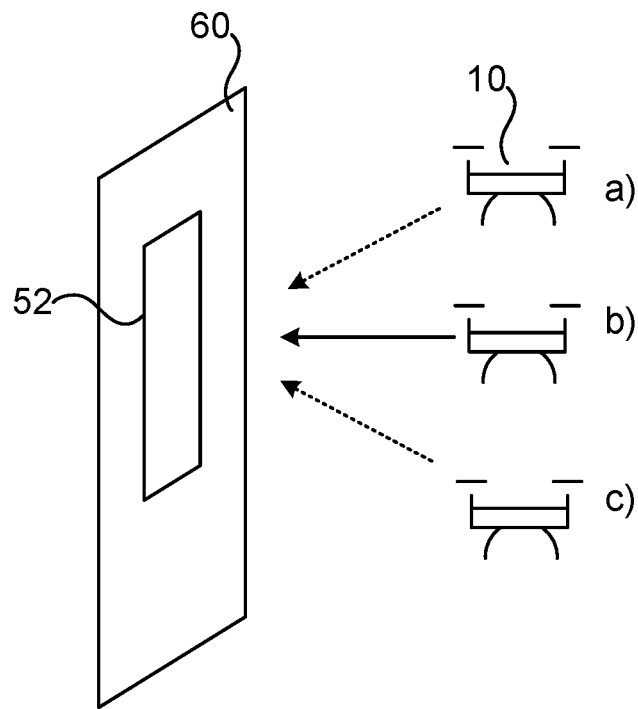
FIG. 8 illustrates a positioning of a UAV in front of an antenna according to an embodiment.

Based on the estimated depth information, a distance to a dominant plane 60 of a front of the antenna 52 is determined such that the UAV 10 is correctly positioned in step S101d, see FIG. 8. To further increase exactness in positioning of the UAV, an inertial measurement unit (IMU) may be utilized to control yaw, pitch and roll of the UAV 10. Hence, the UAV may be positioned such that it is located in front of the antenna 52 with an optical axis of its camera being more or less perpendicular to the dominant plane 60.

As is understood, In the three positions a), b), c) that the UAV 10 attains in FIG. 8, position b) is the best for acquiring the correct SIB1 message, since the signal strength of data sent by the antenna 52 is at its greatest when the UAV 10 (and thus the camera of the UAV) is positioned in front of a dominant plane 60 of the antenna 52. In other words, the optical axis of the camera of the UAV 10 is perpendicular to the dominant plane 60 of the antenna 52.

Thereafter, the UAV 10 proceeds as previously with acquiring the SIB1 transmitted by the antenna 52 in step S102 and by associating the acquired SIB1 with the captured image in step S103, the antenna 52 can subsequently by identified in step S104, as described hereinabove with reference to Table 1.

In a further embodiment, the UAV 10 may hover around an object from which it is to acquire the SIB1 message and measure e.g. Reference Signal Received Power (RSRP) and/or Received Signal Strength Indicator (RSSI) i.e., the strength of the signal that is being transmitted from the object. In a position where the UAV 10 attains a greatest RSRP and/or RSSI, the SIB1 message would typically be acquired.

Figure 9:
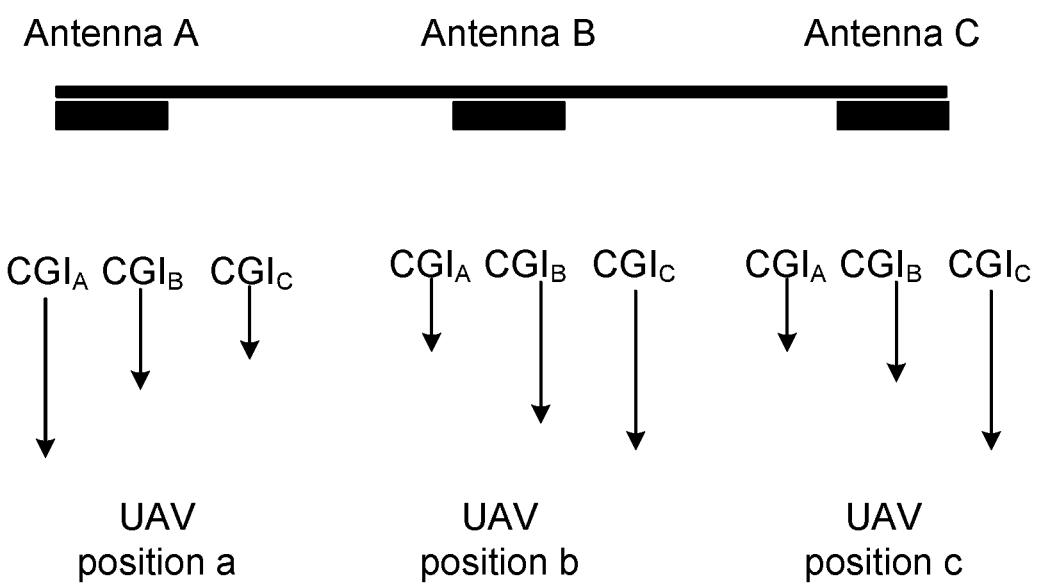
FIG. 9 illustrates detection of multiple cell identifiers for captured images.

FIG. 9 illustrates an embodiment where signal strength is taken into account. In this exemplifying embodiment, a cell site with three antennas A, B and C is considered. As is illustrated, the UAV captures an image and performs an RF scan at three different positions, typically in front of the respective antenna.

Figure 10:
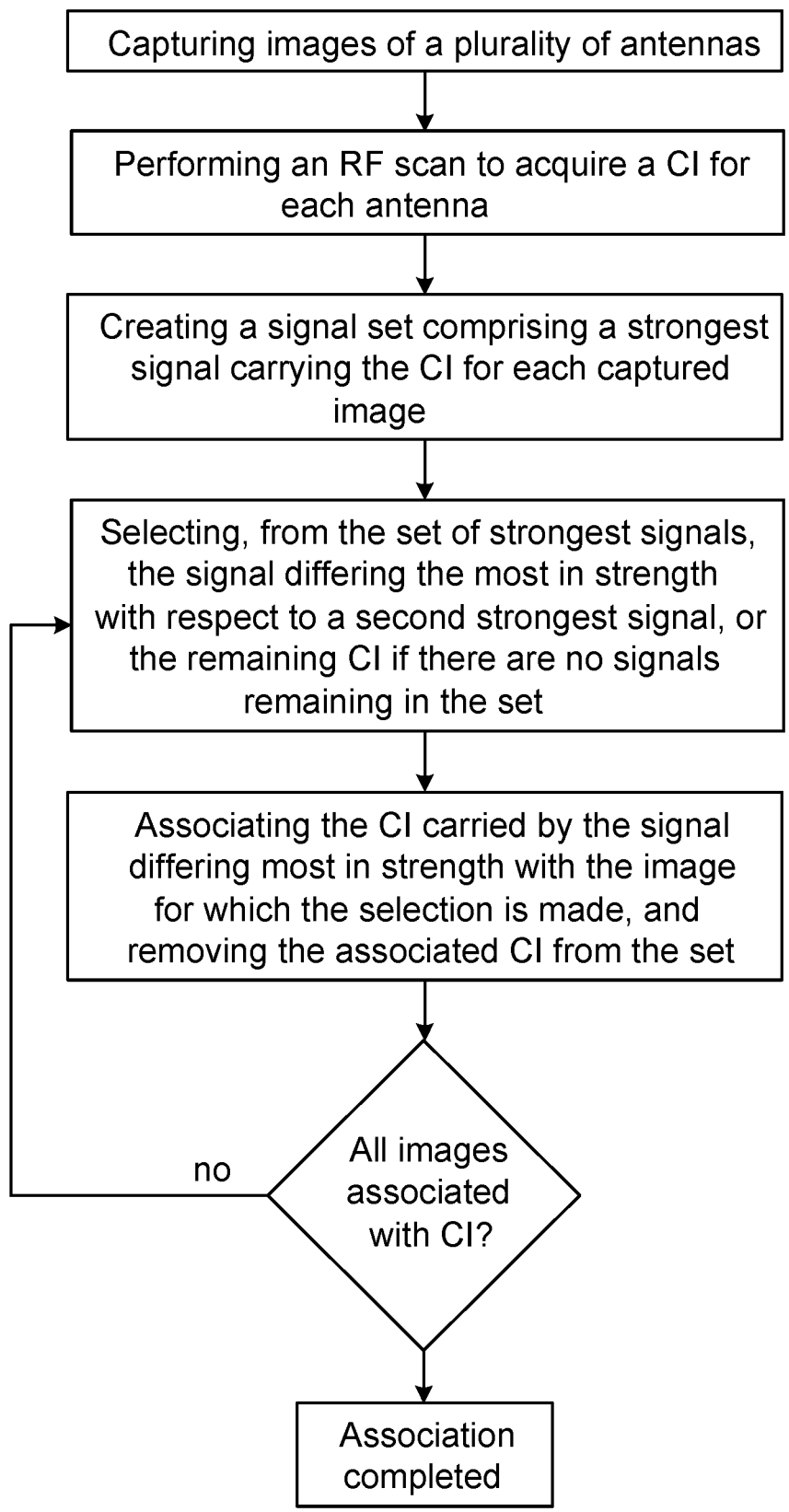
FIG. 10 shows a flowchart of a method of a device configured to enable identification of an object according to an embodiment.

Reference is further made to FIG. 10 showing a flowchart of a method according to an embodiment.

At each position, the UAV captures one or more images of the corresponding antenna in step S101 and performs an RF scan in step S102 for each captured image to obtain the SIB1 message and thus the corresponding CGI. Hence in position A, the UAV captures an image of antenna A and performs an RF scan and thus obtains the CGI of antenna A, $CGI_A$, but also the CGI of antenna B ($CGI_B$), as well as the CGI of antenna C ($CGI_C$). Length of each arrow indicates strength of the respective CGI signal being received. Hence, as may be expected, in position a the strength of $CGI_A$ is greatest, followed by $CGI_B$ being the second greatest and $CGI_C$ being the weakest.

The UAV could come to the conclusion that $CGI_A$ should be associated with the captured image at position a since that signal has the greatest strength and hence is most likely to be the signal transmitted by antenna A.

Under normal conditions, the signal carrying $CGI_A$ is the strongest in position a, while the signal carrying $CGI_B$ is the strongest in position b, and the signal carrying $CGI_C$ is the strongest in position c. However, due to errors in RF scan, erroneous equipment, non-standard cell site configuration, etc., this could be violated. This is illustrated in position b, where the signal carrying $CGI_C$ is slightly stronger than that carrying $CGI_B$.

Consequently, this creates ambiguity in associating the image captured of antenna B with either $CGI_B$ or $CGI_C$ (the association made may even be erroneous).

To resolve this problem, the UAV will for each captured image select the strongest signal and create a set comprising these signals in step S102a; in position a this will be the signal carrying $CGI_A$, in position b it will be the signal carrying $CGI_C$, and in position c it will also be the signal carrying $CGI_C$.

Of this set of strongest signals ($CGI_A$, $CGI_C$, $CGI_C$, respectively), the UAV will in step S102b select the signal differing the most in strength with respect to a second strongest signal (i.e. the signal having a greatest Δ in terms of strength compared to the second strongest signal) at a given position.

As can be concluded, $CGI_A$ will be selected in step S102b since it differs most in strength with respect to the second strongest signal (i.e. $CGI_B$) for the captured image in position a as compared to $CGI_C$ in both positions b and c, and $CGI_A$ will thus be associated with the image captured in position a in step S103a.

The signal carrying $CGI_A$ will further be removed from the set of strongest signals in step S103a.

In step S103b, it is determined if all images have been associated with a CGI, and if not the process repeats step S102b, where in this exemplifying embodiment, $CGI_C$ will be selected since it has the greatest difference in strength to the second strongest signal (i.e. $CGI_B$) in position c as compared to $CGI_C$ in position b, and $CGI_C$ will thus be associated in step S103a with the image captured in position c.

Since $CGI_C$ now has been associated with the images captured in position c, it will be removed from the set of strongest signals, which has as a consequence that no signals carrying a CGI remains in the set.

Thus, in step S102b the signal carrying the only remaining CGI, i.e. $CGI_B$, will be selected and associated in step S103a with the image captured at position b. It will thus be determined in step S103b that all images have been associated with a CGI, and the association is thus completed.

Figure 11:
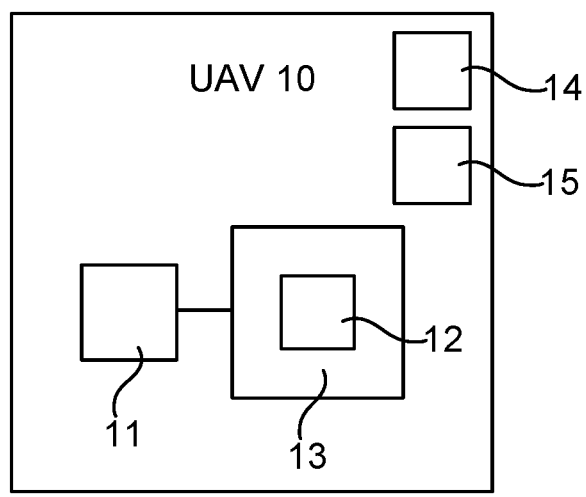
FIG. 11 illustrates a device configured to enable identification of an object according to an embodiment.

FIG. 11 illustrates a device 10 configured to enable identification of telecommunication equipment according to an embodiment illustrated by a UAV. The steps of the method performed by the UAV 10 are in practice performed by a processing unit 11 embodied in the form of one or more microprocessors arranged to execute a computer program 12 downloaded to a suitable storage volatile medium 13 associated with the microprocessor, such as a Random Access Memory (RAM), or a non-volatile storage medium such as a Flash memory or a hard disk drive. The processing unit 11 is arranged to cause the UAV 10 to carry out the method according to embodiments when the appropriate computer program 12 comprising computer-executable instructions is downloaded to the storage medium 13 and executed by the processing unit 11. The storage medium 13 may also be a computer program product comprising the computer program 12. Alternatively, the computer program 12 may be transferred to the storage medium 13 by means of a suitable computer program product, such as a Digital Versatile Disc (DVD) or a memory stick. As a further alternative, the computer program 12 may be downloaded to the storage medium 13 over a network. The processing unit 11 may alternatively be embodied in the form of a digital signal processor (DSP), an application specific integrated circuit (ASIC), a field-programmable gate array (FPGA), a complex programmable logic device (CPLD), etc. The UAV 10 further comprises a camera 14 for acquitting visual representations of an object by capturing images or videos of the object, and a device such as a receiver of transceiver 15 capable of performing an RF scan of the object, the transceiver 15 possibly also being used for communicating with further devices, such as server 40.

Figure 12:
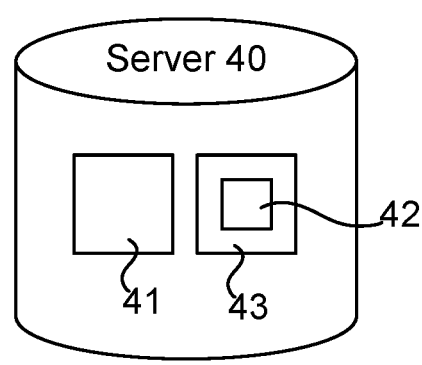
FIG. 12 illustrates a device configured to identify an object according to an embodiment.

FIG. 12 illustrates a device 40 configured to perform identification of telecommunication equipment according to an embodiment illustrated by a server. The steps of the method performed by the server 40 are in practice performed by a processing unit 41 embodied in the form of one or more microprocessors arranged to execute a computer program 42 downloaded to a suitable storage volatile medium 43 associated with the microprocessor, such as a RAM, or a non-volatile storage medium such as a Flash memory or a hard disk drive. The processing unit 41 is arranged to cause the server 40 to carry out the method according to embodiments when the appropriate computer program 42 comprising computer-executable instructions is downloaded to the storage medium 43 and executed by the processing unit 41. The storage medium 43 may also be a computer program product comprising the computer program 42. Alternatively, the computer program 42 may be transferred to the storage medium 43 by means of a suitable computer program product, such as a DVD or a memory stick. As a further alternative, the computer program 42 may be downloaded to the storage medium 43 over a network. The processing unit 41 may alternatively be embodied in the form of a DSP, an ASIC, an FPGA, a CPLD, etc.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method performed by a device of enabling identification of each of two or more pieces of telecommunication equipment mounted to a cell tower, the method comprising:
   acquiring a visual representation of each of the two or more pieces of telecommunication equipment mounted to the cell tower;
   determining which cell identifiers are associated with which of the pieces of telecommunication equipment mounted to the cell tower, by, for each of the two or more pieces of telecommunication equipment, performing a radio frequency scan of the piece of telecommunication equipment to acquire a cell identifier for the piece of telecommunication equipment; and
   for each of the two or more pieces of telecommunication equipment mounted to the cell tower, associating the visual representation of the piece of telecommunication equipment with the cell identifier determined to be associated with the piece of telecommunication equipment.

2. The method of claim 1, further comprising, for each of the two or more pieces of telecommunication equipment, mapping the cell identifier acquired for the piece of telecommunication equipment to pre-stored information identifying the piece of telecommunication equipment.

3. The method of claim 1, further comprising, for each of the two or more pieces of telecommunication equipment, detecting, from the visual representation acquired of the piece of telecommunication equipment, a category to which said piece of telecommunication equipment belongs.

4. The method of claim 3, further comprising, for each of the two or more pieces of telecommunication equipment:
   extracting keypoints from the piece of telecommunication equipment;
   attaining depth information of the visual representation of the piece of telecommunication equipment by matching the extracted keypoints to a 3D representation of the piece of the telecommunication equipment; and
   positioning the device in relation to the piece of telecommunication equipment as determined by the attained depth information.

5. The method of claim 4, wherein acquiring the visual representation of each of the two or more pieces of telecommunication equipment comprises, for each of the two or more pieces of telecommunication equipment, acquiring the visual representation of the piece of telecommunication equipment from a position in front of the piece of telecommunication equipment.

6. The method of claim 1, wherein, for each of the two or more pieces of telecommunication equipment, the visual representation of the piece of telecommunication equipment comprising an image of the piece of the telecommunication equipment captured by the device.

7. The method of claim 1, wherein, for each of the two or more pieces of telecommunication equipment, the cell identifier acquired for the piece of telecommunication equipment is comprised in an acquired System Information Block type 1 (SIB1) message.

8. The method of claim 1, wherein determining which cell identifiers are associated with which of the pieces of telecommunication equipment mounted to the cell tower comprises acquiring a plurality of cell identifiers for each acquired visual representation, and wherein the method comprises:
   creating a signal set comprising a strongest signal carrying a cell identifier for each visual representation;
   selecting, from the created signal set, a signal differing the most in strength with respect to a second strongest signal;
   wherein associating the cell identifier acquired for a piece of telecommunication equipment with the acquired visual representation of the piece of telecommunication equipment comprises associating the cell identifier carried by the signal differing most in strength with respect to the second strongest signal with the visual representation for which the selection is made, and removing the associated cell identifier from the signal set;
   wherein the selecting, from the created signal set, of the signal differing the most in strength with respect to the second strongest signal and the associating of the cell identifier carried by said signal are repeated until all acquired visual representations have been associated with a cell identifier, or if there are no signals remaining in the set, associating the remaining cell identifier with a corresponding remaining visual representation.

9. The method of claim 1, wherein the radio frequency scan comprises a passive scan.

10. A method performed by a device of performing identification of each of two or more pieces of telecommunication equipment mounted to a cell tower, the method comprising:
for each of the two or more pieces of telecommunication equipment mounted to the cell tower, acquiring a visual representation of the piece of telecommunication equipment and a cell identifier having been acquired by performing a radio frequency scan of the piece of telecommunication equipment for the acquired visual representation; and
for each of the two or more pieces of telecommunication equipment, mapping the cell identifier acquired for the piece of telecommunication equipment to pre-stored information identifying the piece of telecommunication equipment.

11. A device configured to enable identification of each of two or more pieces of telecommunication equipment mounted to a cell tower, the device comprising:
a camera;
a radio frequency transceiver; and
a processing unit and a memory, said memory containing instructions executable by said processing unit, whereby the device is configured to:
acquire, with the camera, a visual representation of each of the two or more pieces of telecommunication equipment mounted to the cell tower;
determine which cell identifiers are associated with which of the pieces of telecommunication equipment mounted to the cell tower, by, for each of the two or more pieces of telecommunication equipment, using the radio frequency transceiver to perform a radio frequency scan of the piece of telecommunication equipment to acquire a cell identifier for the piece of telecommunication equipment; and
for each of the two or more pieces of telecommunication equipment mounted to the cell tower, associate the visual representation of the piece of telecommunication equipment with the cell identifier determined to be associated with the piece of telecommunication equipment.

12. The device of claim 11, said memory containing instructions executable by said processing unit, whereby the device is further configured to, for each of the two or more pieces of telecommunication equipment, map the cell identifier acquired for the piece of telecommunication equipment to pre-stored information identifying the piece of telecommunication equipment.

13. The device of claim 11, said memory containing instructions executable by said processing unit, whereby the device is further configured to, for each of the two or more pieces of telecommunication equipment, detect, from the visual representation acquired of the piece of telecommunication equipment, a category to which said piece of telecommunication equipment belongs.

14. The device of claim 13, said memory containing instructions executable by said processing unit, whereby the device is further configured to, for each of the two or more pieces of telecommunication equipment:
extract keypoints from the piece of telecommunication equipment;
attain depth information of the visual representation of the piece of telecommunication equipment by matching the extracted keypoints to a 3D representation of the piece of the telecommunication equipment; and
position the device in relation to the piece of telecommunication equipment as determined by the attained depth information.

15. The device of claim 14, said memory containing instructions executable by said processing unit, whereby the device is configured to, for each of the two or more pieces of telecommunication equipment, acquire the visual representation of the piece of telecommunication equipment from a position in front of the piece of telecommunication equipment.

16. The device of claim 11, wherein, for each of the two or more pieces of telecommunication equipment, the visual representation of the piece of telecommunication equipment comprising an image of the piece of the telecommunication equipment captured by the device.

17. The device of claim 11, said memory containing instructions executable by said processing unit, whereby the device is configured to, for each of the two or more pieces of telecommunication equipment, acquire the cell identifier for the piece of telecommunication equipment from a System Information Block type 1 (SIB1) message.

18. The device of claim 11, said memory containing instructions executable by said processing unit, whereby the device is configured to determine which cell identifiers are associated with which of the pieces of telecommunication equipment mounted to the cell tower by acquiring a plurality of cell identifiers for each acquired visual representation, and to:
create a signal set comprising a strongest signal carrying a cell identifier for each visual representation;
select, from the created signal set, a signal differing the most in strength with respect to a second strongest signal;
wherein the device is configured to associate the cell identifier acquired for a piece of telecommunication equipment with the acquired visual representation of the piece of telecommunication equipment comprises associating the cell identifier carried by the signal differing most in strength with respect to the second strongest signal with the visual representation for which the selection is made, and remove the associated cell identifier from the signal set;
wherein the device is configured to repeat selection, from the created signal set, of the signal differing the most in strength with respect to the second strongest signal and association of the cell identifier carried by said signal until all acquired visual representations have been associated with a cell identifier, or if there are no signals remaining in the set, associate the remaining cell identifier with a corresponding remaining visual representation.

19. The device of claim 11, wherein the radio frequency scan comprises a passive scan.

20. A device configured to perform identification of a telecommunication equipment, the device comprising:
a processing unit and a memory, said memory containing instructions executable by said processing unit, whereby the device is configured to:
for each of the two or more pieces of telecommunication equipment mounted to the cell tower, acquire a visual representation of the piece of telecommunication equipment and a cell identifier having been acquired by performing a radio frequency scan of the piece of telecommunication equipment for the acquired visual representation; and
for each of the two or more pieces of telecommunication equipment, map the cell identifier acquired for the piece of telecommunication equipment to pre-stored information identifying the piece of telecommunication equipment.

21. The device of claim 11, wherein the two or more pieces of telecommunication equipment include two or more antennas with which the cell tower is equipped.

22. The device of claim 21, said memory containing instructions executable by said processing unit, whereby the device is configured to determine which cell identifiers are associated with which antennas of the cell tower, and to, for each of the antennas, associate a visual representation of the antenna acquired with the camera with the cell identifier that is determined to be associated with the antenna.

23. The method of claim 1, wherein the two or more pieces of telecommunication equipment include two or more antennas with which the cell tower is equipped, wherein said determining comprises determining which cell identifiers are associated with which antennas of the cell tower, and wherein said associating comprises, for each of the antennas, associating a visual representation of the antenna with the cell identifier that is determined to be associated with the antenna.

24. The method of claim 10, wherein the two or more pieces of telecommunication equipment include two or more antennas with which the cell tower is equipped, and wherein said mapping comprises, for each of the antennas, mapping the cell identifier acquired for the antenna with pre-stored information identifying the antenna.

25. The device of claim 20, wherein the two or more pieces of telecommunication equipment include two or more antennas with which the cell tower is equipped, said memory containing instructions executable by said processing unit whereby the device is configured to, for each of the antennas, map the cell identifier acquired for the antenna with pre-stored information identifying the antenna.

* * * * *